United States Patent
Ho (10) Patent No.: US 12,147,782 B2
(45) Date of Patent: Nov. 19, 2024

(54) PERIPHERAL TOOLDUAL/QUAD-FRACTURABLE DIGITAL SIGNAL PROCESSING BLOCK FOR PROGRAMMABLE GATE ARCHITECTURES

(71) Applicant: EFINIX, INC., Santa Clara, CA (US)

(72) Inventor: Ho Man Ho, Hong Kong (CN)

(73) Assignee: EFINIX, INC., Santa Clara, CA (US)

( * ) Notice: Subject to any disclaimer, the term of this patent is extended or adjusted under 35 U.S.C. 154(b) by 659 days.

(21) Appl. No.: 17/389,128

(22) Filed: Jul. 29, 2021

(65) Prior Publication Data
US 2022/0317970 A1 Oct. 6, 2022

Related U.S. Application Data

(60) Provisional application No. 63/168,017, filed on Mar. 30, 2021, provisional application No. 63/168,009, filed on Mar. 30, 2021.

(51) Int. Cl.
*G06F 7/487* (2006.01)
*G06F 7/485* (2006.01)
*G06F 7/544* (2006.01)

(52) U.S. Cl.
CPC ............ *G06F 7/4876* (2013.01); *G06F 7/485* (2013.01); *G06F 7/5443* (2013.01)

(58) Field of Classification Search
CPC .......... G06F 7/50; G06F 7/523; G06F 7/5324; G06F 7/5443; G06F 7/57; G06F 30/34; G06F 2207/382
See application file for complete search history.

(56) References Cited

U.S. PATENT DOCUMENTS

| | | | | |
|---|---|---|---|---|
| 8,386,553 | B1 * | 2/2013 | Langhammer | G06F 7/5324 708/622 |
| 9,189,200 | B1 * | 11/2015 | Langhammer | G06F 7/483 |
| 10,776,078 | B1 * | 9/2020 | Clark | G06F 7/4876 |
| 2005/0027773 | A1 * | 2/2005 | Machnicki | G06F 7/505 708/523 |
| 2005/0144215 | A1 * | 6/2005 | Simkins | G06F 7/5443 708/620 |
| 2008/0133627 | A1 * | 6/2008 | Langhammer | G06F 7/5324 708/130 |
| 2015/0169289 | A1 * | 6/2015 | Tannenbaum | G06F 7/4876 708/503 |
| 2021/0042087 | A1 * | 2/2021 | Pugh | G06F 7/4876 |

OTHER PUBLICATIONS

Warrier, Rakesh et al., "Fracturable DSP block for multi-context reconfigurable architectures", Circuits, Systems, and Signal Processing, vol. 36, pp. 3020-3033, 2017 (Year: 2017).*
Altera Inc, Variable Precision DSP Blocks in Stratix V Devices, 2013 (Year: 2013).*

* cited by examiner

*Primary Examiner* — Matthew D Sandifer
(74) *Attorney, Agent, or Firm* — Womble Bond Dickinson (US) LLP (57) ABSTRACT

A digital signal processor (DSP), which may be implemented as a DSP block in a field programmable gate array (FPGA), includes a fracturable multiplier, a fracturable adder and a fracturable variable shifter. Further included is at least one sign-extension block, to provide for normal mode, dual-fracturing mode and quad-fracturing mode.

18 Claims, 7 Drawing Sheets

PERIPHERAL TOOLDUAL/QUAD-FRACTURABLE DIGITAL SIGNAL PROCESSING BLOCK FOR PROGRAMMABLE GATE ARCHITECTURES

This application claims benefit of priority from U.S. Provisional Application No. 63/168,017 filed Mar. 30, 2021, which is hereby incorporated by reference. The present application is further related to U.S. Provisional Application No. 63/168,009 filed Mar. 30, 2021, which is hereby incorporated by reference.

FIELD OF THE INVENTION

Embodiments disclosed herein relate to the field of programmable gate architectures; more particularly, embodiments disclosed herein relate to programmable gate architectures with a DSP block design that is fracturable.

BACKGROUND

Modern field programmable gate array (FPGA) fabric architecture consists of programmable logic, programmable routing, and macro blocks like memory blocks, digital signal processing (DSP) blocks, phase-locked loops (PLLs), etc. The DSP block usually provides mathematical functions that are otherwise less efficiently implemented with programmable logic, like integer multiply and add.

Typically, the DSP block in a FPGA is designed to handle input arguments of specific widths for each sub-module, e.g., 27×18-bit multipliers, 48-bit adders, etc. Some are designed to have multiple copies of operator/slice packed into the same DSP block, such that they can work individually or together as a single wider element. The single, wider element that can be separated into multiple, narrower elements in a DSP block is referred to as a fracturable element. One example is to have two 19×18 multipliers, with an internal adder, to perform as a 27×27 multiplier. In this example, the 27×27 multiplier that can be separated into multiple, narrower multipliers is considered a fracturable multiplier. Another example setup is having two 18×18 multipliers per slice, two slices per block, that can act as one 36×36 multiplier, or further divided into two 9×9 multipliers per slice, totaling to eight 9×9 multipliers in a single DSP block, at the cost of some adders being disabled.

Pairing multiple DSPs into wider element(s) allows for wider mathematic operations to be handled with DSP blocks at higher clock rate and less logic element usage compared to using logic elements alone. Fracturing DSP blocks into multiple narrower operators increases the number of mathematic operators that can be handled with the same amount of physical DSP blocks, thereby significantly increasing the throughput of the FPGA for the narrower data widths.

There is an ongoing need for greater flexibility of configuration of blocks in FPGAs, and greater versatility. In this environment, present embodiments arise.

SUMMARY

Various embodiments are described for a digital signal processor (DSP) that has fracturable elements. Some embodiments are implemented as DSP blocks. Some embodiments are implemented as DSP blocks in a field programmable gate array (FPGA).

One embodiment is a digital signal processor. The DSP includes a fracturable multiplier, a fracturable adder, and a fracturable variable shifter. The DSP further includes at least one sign-extension block. The sign-extension block is to provide a same mode of operations across modes of the DSP. Modes of the DSP include normal mode, dual-fracturing mode and quad-fracturing mode.

One embodiment is a DSP block in an FPGA. The DSP block includes a fracturable multiplier, a fracturable adder, a first sign-extension block, a second sign-extension block, and a fracturable variable shifter. The fracturable multiplier provides a single multiplier in normal mode, two multipliers in dual-fracturing mode, and four multipliers in quad-fracturing mode. The first sign-extension block couples the fracturable multiplier to the fracturable adder. The second sign-extension block couples an input to the fracturable adder. The fracturable variable shifter is coupled to the fracturable adder. The fracturable variable shifter provides a single shifter in normal mode, two shifters in dual-fracturing mode, and four shifters in quad-fracturing mode. Each such shifter is to shift a result from the fracturable adder according to a shift argument.

One embodiment is a method performed by a DSP block. The method includes coupling a fracturable multiplier, a fracturable adder and a fracturable variable shifter, to perform digital signal processing. The method further includes supporting modes of the DSP block. The modes include normal mode, dual-fracturing mode and quad-fracturing mode. Supporting is through at least one sign-extension block.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

Embodiments described herein will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments disclosed herein relate to programmable gate architectures with a DSP block design that is fracturable into dual or quad mode, while retaining its full functionality of multiply-add-right-shift for all of the 2/4 lanes, respectively. Fracturability and various fracturable elements, such as components, signal paths, input ports and output ports, are implemented through circuitry that has selectability and/or programmability for differing bit widths and operating modes, for example in an FPGA or other integrated circuit in various embodiments.

Embodiments described herein include a new DSP block design that is dual/quad-fracturable, without loss of any functionality. Specifically, the number of multiply-add-right-shift operations that can be performed per cycle is doubled/quadrupled, when the data width is at about half/one-fourth of the original data width. In one embodiment, each sub-block of the DSP, including the multiplier, the adder and the variable right-shifter, supports both dual and quad fractured (or fracturing) modes, where the sub-blocks would each perform like 2/4 instances respectively, at half/one-fourth the original input and output bit-widths.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1A:
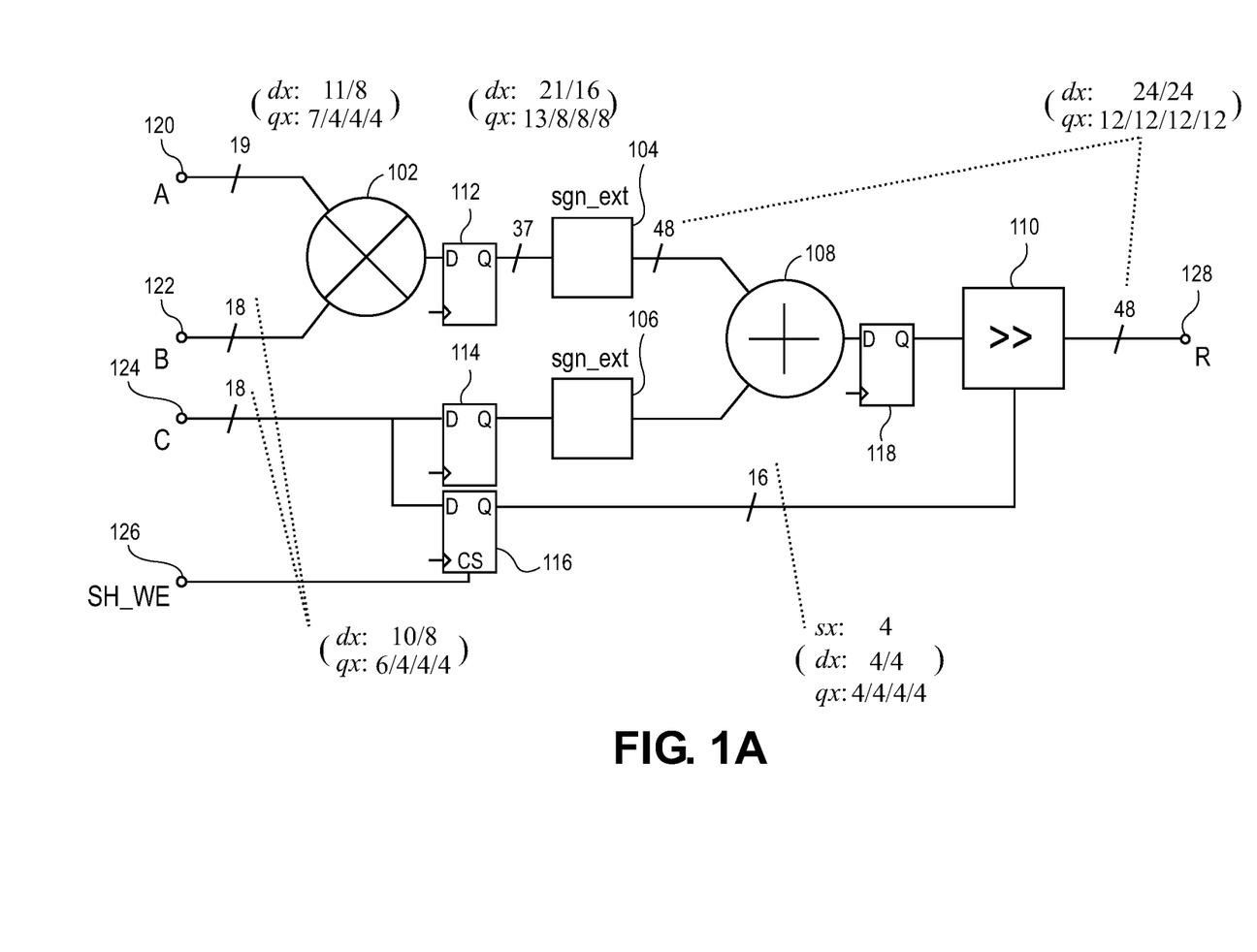
FIG. 1A illustrates an overall architecture of one embodiment of a DSP, which has sub-blocks (e.g., multiplier, adder, variable right shifter) that are each dual/quad fracturable.

FIG. 1A illustrates the overall architecture of one embodiment of a DSP design. This and further embodiments are suitable for implementation as blocks in an integrated circuit, and more specifically are suitable for implementation as DSP blocks in an FPGA. Referring to FIG. 1A, the DSP includes a 19×18 multiplier 102, a 48-bit adder 108, and a 48-bit-input/4-bit-argument variable right-shifter 110, each as a fracturable element in the DSP. For the multiplier 102, in dual fracturing mode, the input bit-widths of the fractured multipliers (see also FIG. 1B) are 11×10 for the most significant bit (MSB) lane and 8×8 for the least significant bit (LSB) lane, yielding 21-bits and 16-bits results. During quad fracturing mode, the MSB lane is 7×6, while the 3 other lanes are 4×4, yielding 13-bits and 8-bits results, respectively. For the adder 108 and variable-right-shifter 110 as fracturable elements, the dual and quad fracturing mode (see also FIG. 1B) splits the input and output evenly, e.g., inputs and outputs of the fractured elements are 24-bits in dual mode and 12-bits in quad mode. The sign extension blocks 104, 106 (labelled "sgn_ext" in FIG. 1A and FIG. 1B) do sign-extension, zero padding on MSB, or align-left (zero padding on LSB) depending on runtime configurations. In case(s) where input-width is larger than output-width, extra bits are truncated.

Continuing in FIG. 1A, the DSP embodiment shown has an input port 120 with a bit width of 19 bits, for input A to the fracturable multiplier 102. The input port 120 and input A path to the fracturable multiplier 102 is fracturable to dx paths having bit widths of 11 bits and 8 bits (i.e., total 19 bits) in dual fracturing mode for respective input to the two fractured multipliers of fracturable multiplier 102, and is fracturable to qx paths having 7, 4, 4 and 4 bits (i.e., total 19 bits) in quad fracturing mode for respective input to the four fractured multipliers of fracturable multiplier 102. Input port 122 has a bit width of 18 bits for input B to the fracturable multiplier 102, is fracturable from the 18 bit width of normal mode to dx paths having bit widths of 10 bits and 8 bits (i.e., total 18 bits) in dual fracturing mode for respective input to the two fractured multipliers, and is fracturable to qx paths having 6, 4, 4 and 4 bits (i.e., total 18 bits) in quad fracturing mode for respective input to the four fractured multipliers.

Input port 124 has a bit width of 18 bits for input C to the two latches 114, 116, which may be operated independently to latch differing values from input C, as further described below. The input port 124 and input C path is fracturable to dx paths having bit widths of 10 bits and 8 bits (i.e., total 18 bits) in dual fracturing mode, and is fracturable to qx paths having bit widths of 6, 4, 4 and 4 bits in quad fracturing mode.

The latch 112 latches output and result from the fracturable multiplier 102, for input to the sign-extension block 104. The path from output of the latch 112 to input of the sign-extension block 104, the sign-extension block 104, and the path from output of the sign-extension block 104 to the fracturable adder 108 are fracturable. From a bit width of 37 bits in normal mode, the path from output of the latch 112 to input of the sign-extension block 104 is fracturable to dx paths having bit widths of 21 and 16 bits (i.e., total 37 bits) in dual fracturing mode, and is fracturable to qx paths having bit widths of 13, 8, 8 and 8 bits (i.e., total 37 bits) in quad fracturing mode. From a bit width of 48 bits in normal mode, the path from output of the sign-extension block 104 to input of the fracturable adder 108 is fracturable to dx paths having bit widths of 21 and 16 bits (i.e., total 37 bits) for respective input to the two fractured adders from the fracturable adder 108 in dual fracturing mode, and is fracturable to qx paths having bit widths of 13, 8, 8 and 8 bits (i.e., total 37 bits) for respective input to the four fractured adders from the fracturable adder 108 in quad fracturing mode (see also FIG. 1B). Output, and result from the fracturable adder 108, is latched by the latch 118, for input to the fracturable variable shifter 110 in the various modes.

One value from input C is latched by the latch 114 for input to the sign-extension block 106, which sign-extends that value for input to the fracturable adder 108. Another, usually different value from input C is latched by the latch 116 as a shift argument for input to the fracturable variable shifter 110. In one embodiment, the latch 116 is operated by an enable input 126, labeled SH_WE, for shift argument write enable. That path connecting output of the latch 116 to the shift argument input of the fracturable variable shifter 110 is fracturable from a nominal bit width of 16 bits to an sx path having a bit width of 4 bits in normal mode for shift argument of a singular variable shifter, dx paths having bit widths of 4 and 4 bits for respective shift arguments of two variable shifters in dual fracturing mode, and qx paths having bit widths of 4, 4, 4 and 4 bits for respective shift arguments of four variable shifters in quad fracturing mode (see also FIG. 1B).

The fracturable variable shifter 110, the output port 128 for output R and the path from the variable shifter 110 to the output port 128 are fracturable from a singular variable shifter, having a 48 bit width output path to the output port 128 output R in normal mode, to the two variable shifters and dx paths having bit widths of 24 and 24 bits for respective outputs in dual fracturing mode, and the four variable shifters with qx paths having bit widths of 12, 12, 12 and 12 bits for respective outputs in quad fracturing mode.

Figure 1B:
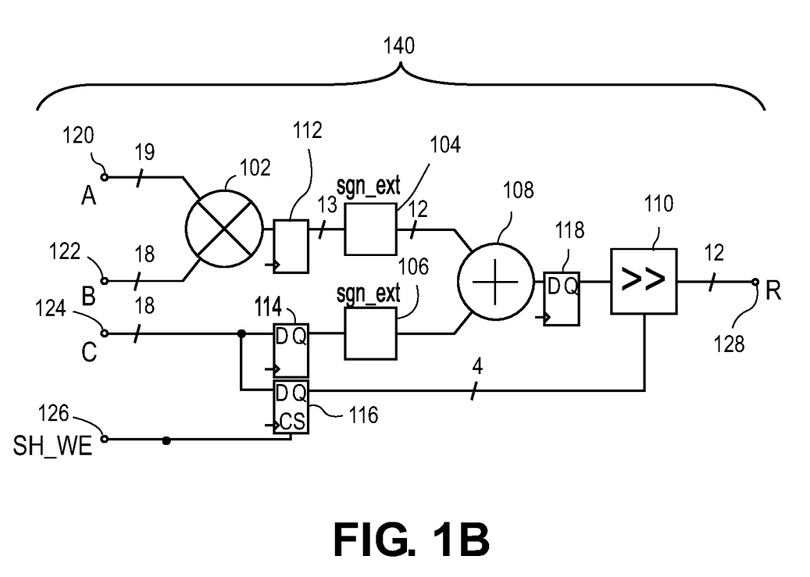
FIG. 1B further illustrates an overall architecture of one embodiment of a DSP, with sub-blocks (e.g., multiplier, adder, variable right shifter) that are each dual/quad fracturable, showing the wider fracturable elements and multiple example narrower fractured elements implemented by fracturing the fracturable elements.

FIG. 1B further illustrates an overall architecture of one embodiment of a DSP, which has sub-blocks (e.g., multiplier, adder, variable right shifter) that are each dual/quad fracturable, showing the wider fracturable elements and multiple example narrower fractured elements implemented by fracturing the fracturable elements. To the left in the drawing, a group 140 depicts all of the fracturable elements of the DSP, from FIG. 1A, in normal mode. Bit widths of components and paths are as described above for normal mode. In the middle of the drawing, the fracturable elements of the DSP are fractured into two groups 142, 144 of components and paths with bit widths as described above for dual fracturing mode. Each group 142, 144 can implement a DSP function, at bit widths that are reduced in comparison to normal mode. To the right in the drawing, the fracturable elements of the DSP are fractured into four groups 146, 148, 150, 152 of components and paths with bit widths as described above for quad fracturing mode. Each group 146, 148, 150, 152 can implement a DSP function, at bit widths that are reduced in comparison to both normal mode and dual fracturing mode.

For fracturability, the fracturable multiplier 102 of the group 140 is fractured into two multipliers 102_dx1, 102_dx2 in dual fracturing mode for the groups 142, 144, and is fractured into four multipliers 102_qx1, 102_qx2, 102_qx3, 102_qx4 in quad fracturing mode for the groups 146, 148, 150, 152. The fracturable adder 108 of the group 140 is fractured into two adders 108_dx1, 108_dx2 in dual fracturing mode for the groups 142, 144, and is fractured into four adders 108_qx1, 108_qx2, 108_qx3, 108_qx4 in quad fracturing mode for the groups 146, 148, 150, 152. The fracturable variable shifter 110 of the group 140 is fractured into two variable shifters 110_dx1, 110_dx2 in dual fracturing mode for the groups 142, 144, and is fractured into four variable shifters 110_qx1, 110_qx2, 110_qx3, 110_qx4 in quad fracturing mode for the groups 146, 148, 150, 152.

Latches 112, 114, 116, 118 of the group 140 are fractured into latches 112_dx1, 114_dx1, 116_dx1, 118_dx1 for the group 142 and latches 112_dx2, 114_dx2, 116_dx2, 118_dx2 for the group 144 in dual fracturing mode, and are fractured into latches 112_qx1, 114_qx1, 116_qx1, 118_qx1 for the group 146, latches 112_qx2, 114_qx2, 116_qx2, 118_qx2 for the group 148, latches 112_qx3, 114_qx3, 116_qx3, 118_qx3 for the group 150, and latches 112_qx4, 114_qx4, 116_qx4, 118_qx4 for the group 152 in quad fracturing mode. Sign-extension blocks 104, 106 of the group 140 are fractured into sign-extension blocks 104_dx1, 106_dx1 for the group 142 and sign-extension blocks 104_dx2, 106_dx2 for the group 144 in dual fracturing mode, and are fractured into sign-extension blocks 104_qx1, 106_qx1 for the group 146, sign-extension blocks 104_qx2, 106_qx2 for the group 148, sign-extension blocks 104_qx3, 106_qx3 for the group 150 and sign-extension blocks 104_qx4, 106_qx4 for the group 152 in quad fracturing mode.

Input ports 120, 122, 124 of the group 140 are fractured into input ports 120_dx1, 122_dx1, 124_dx1 of the group 142 and input ports 120_dx2, 122_dx2, 124_dx2 of the group 144 in dual fracturing mode, and are fractured into input ports 120_qx1, 122_qx1, 124_qx1 of the group 146, input ports 120_qx2, 122_qx2, 124_qx2 of the group 148, input ports 120_qx3, 122_qx3, 124_qx3 of the group 150 and input ports 120_qx4, 122_qx4, 124_qx4 of the group 152 in quad fracturing mode. Output port 128 of the group 140 is fractured into output ports 128_dx1, 128_dx2 in dual fracturing mode, and is fractured into output ports 128_qx1, 128_qx2, 128_qx3, 128_qx4 in quad fracturing mode.

Various paths are fractured as described above with reference to FIG. 1A and connected to the fractured components as indicated in FIG. 1B, according to the normal, dual fracturing and quad fracturing modes. Thus, depending on which mode is operative in the DSP, the DSP can implement various DSP functions at various bit widths.

Figure 2:
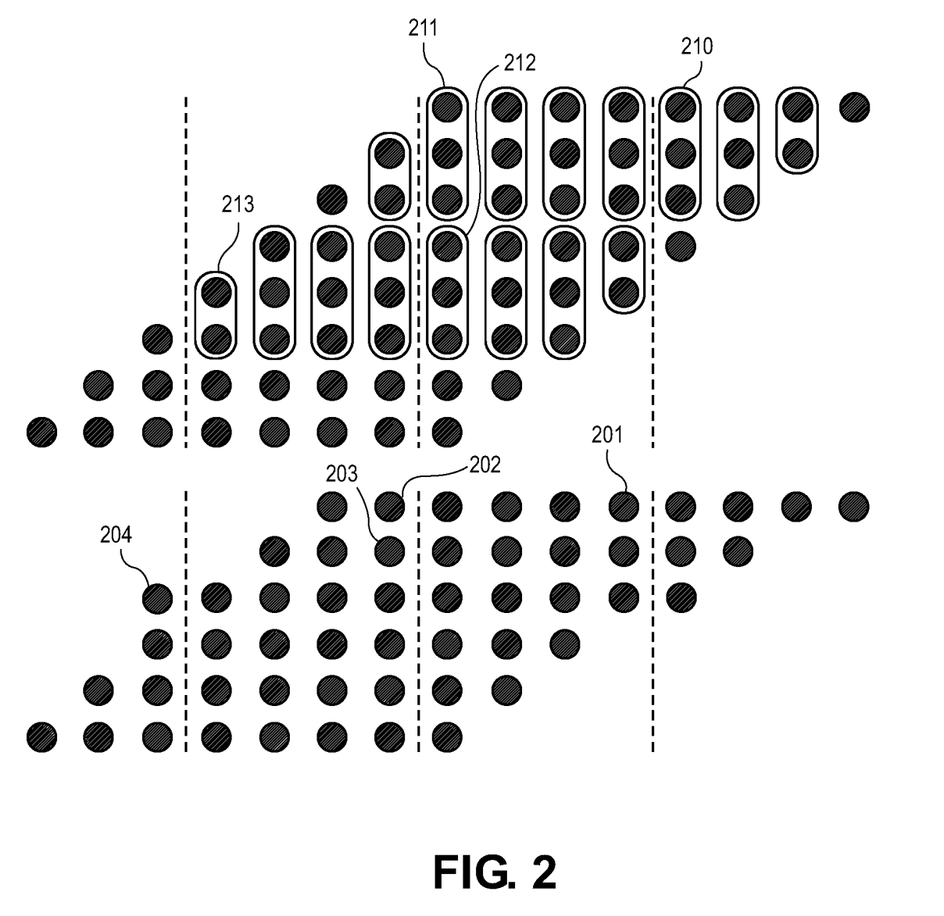
FIG. 2 illustrates the use of carry-gating in a Booth-encoded Wallace tree multiplier to add support for dual/quad fracturing in accordance with one embodiment.

FIG. 2 illustrates the use of carry-gating in a Wallace tree multiplier in accordance of one embodiment to provide dual/quad fracturing, using 8-bits×8-bits for illustration. Referring to FIG. 2, the rows represent one of the multiplied factor's value after being Booth-encoded, 1 encoded value per row, and the dots on each row represent the bits of the other multiplied factor, with dots on the same column having the same weight. This is then reduced layer-by-layer in a Wallace tree, where every 3-bits of the same weight, as grouped into sets in FIG. 2, are passed into one full-adder to yield 1-bit on the left column, and 1-bit on the same column, in the next layer of the tree. The dashed lines are dual/quad fracturing boundaries. Carries that cross fracturing boundaries are those produced from specified sets 210-213, and they yield specified dots 201-204 in the next tree layer, shown in lower part of FIG. 2. By gating these carries on the column 7, 15 and 23's output of the actual 19×18 multiplier (LSB is 0) with the conditions "quad mode" or "dual or quad mode", dual or quad fracturing are supported.

Figure 3:
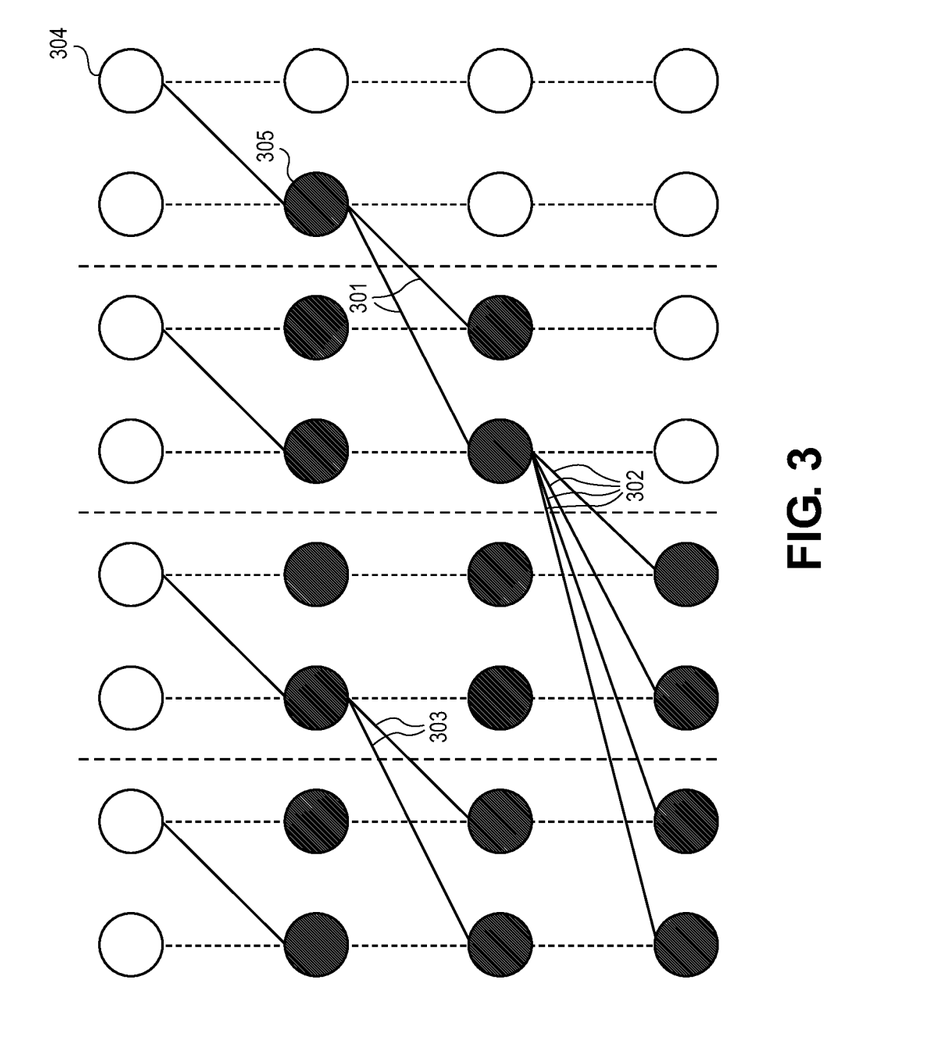
FIG. 3 illustrates the use of carry-gating in the Sklansky adder to add support for dual/quad fracturing in accordance with one embodiment.

FIG. 3 illustrates the use of carry-gating in a Sklansky carry-lookahead adder in accordance of one embodiment to achieve dual/quad fracturing, which is illustrated using an 8-bit adder. The concepts described herein are readily extended to various bit widths, including bit widths specified in examples described herein and variations thereof, for various embodiments of fracturable adders. White (or hollow, outline only) circles 304 on the top row create the initial "generate" and "propagate" terms from the inputs, while black (or filled, solid) circles 305 are "dot" operators (from Brent and Kung) that yield grouped "generate" and "propagate". Carries that cross the fracturing boundaries, shown as connections 301-303 crossing dashed lines (e.g., bit 11, 23 and 35 on the 48-bit adder in various embodiments), are gated with the "quad mode" or "dual or quad mode" conditions, providing 2×24-bit adders in dual mode and 4×12-bit adders in quad mode.

Figure 4:
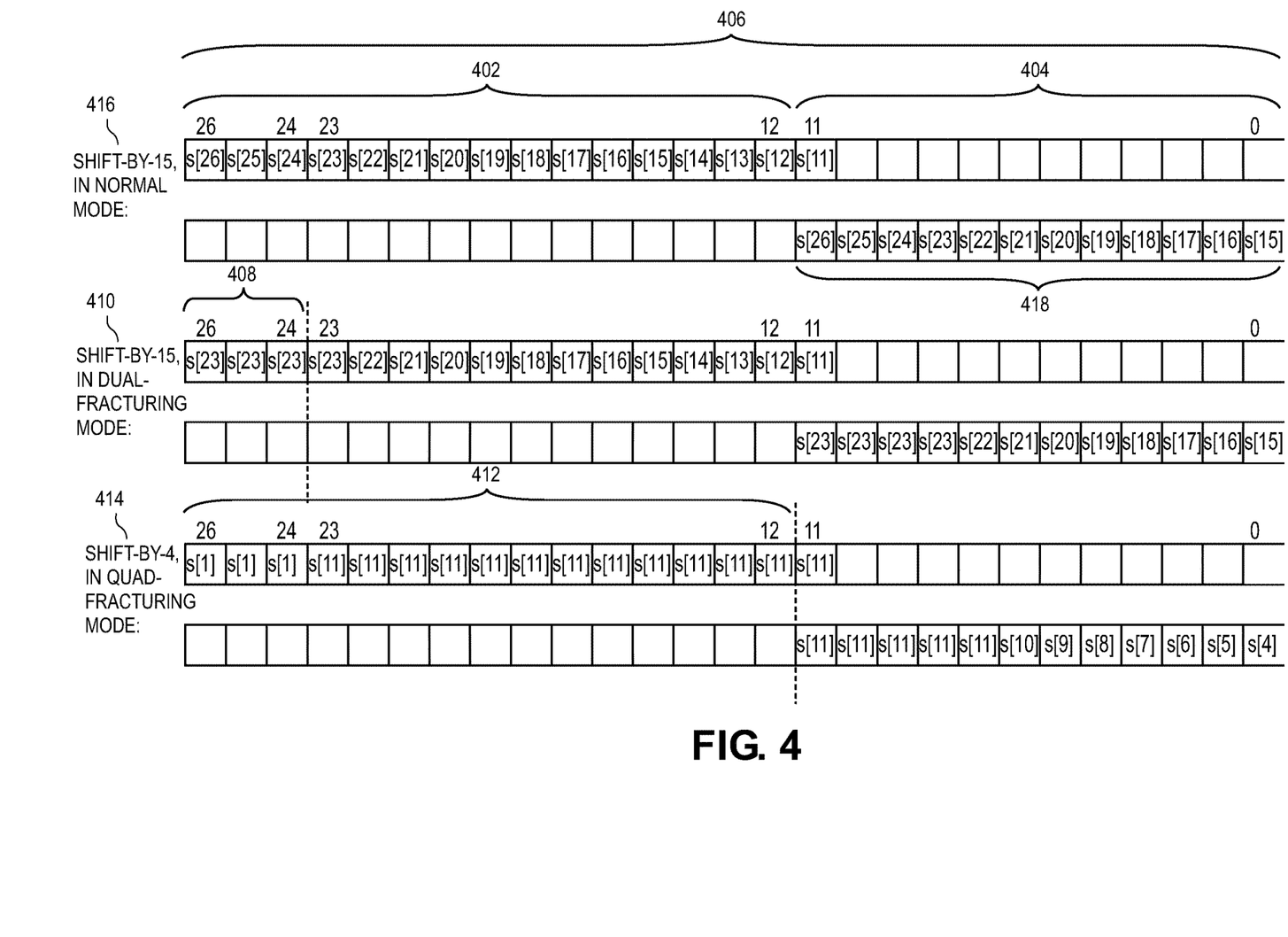
FIG. 4 illustrates the use of four smaller variable right shifters, with four copies of shift-argument registers, to implement a dual/quad fracturable variable right shifter in accordance with one embodiment.

FIG. 4 shows example operations in the LSB lane of the variable-right-shifter, for one embodiment. The 48-bit variable right-shifter (see FIG. 1A and far left in FIG. 1B) is built using 4 sets of 27-bit-input, 12-bit-output, 4-bit-argument right-shifters (see far right in FIG. 1B). With 4-bits shift-argument, the amount of right shift is by-0-bits to by-15-bits. Hence, under normal mode 416, 15 extra bits 402 to the left of the 12-bits-input 404 corresponding to the 12-bits output 418 are needed, making the input 406 have bit width of 27 bits. To facilitate fracturing modes, the bits beyond fracturing boundaries in the input are set to sign-extend the MSB in the fractured input. For example, bits 24~26, input bit group 408, are set to bit 23's value in dual fracturing mode 410, and bits 12~26, input bit group 412, are set to bit 11's value in quad fracturing mode 414. In one embodiment, the same logic is used in all 4 lanes of shifters, with the exception that in the MSB lane sign-extension is needed in normal mode too, since the input is 48-bits. By having 4 sets of 4-bits shift-argument registers, the 4 lanes of shifters can jointly perform as 1×48-bit-input shifter in normal mode, 2×24-bit-input shifters in dual fracturing mode and 4×24-bit-input shifters in quad fracturing mode.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A digital signal processor (DSP), comprising:
   a fracturable multiplier;
   a fracturable adder;
   a fracturable variable shifter; and
   at least one sign-extension block that is configured to provide sign extension across modes of the DSP comprising normal mode, dual-fracturing mode and quad-fracturing mode, wherein:
   the fracturable multiplier, in the normal mode, comprises a 19×18 multiplier;
   the fracturable multiplier, in the dual-fracturing mode, comprises an 11×10 multiplier for a most significant bit (MSB) lane and an 8×8 multiplier for a least significant bit (LSB) lane; or
   the fracturable multiplier, in the quad-fracturing mode, comprises a 7×6 multiplier for the MSB lane and a 4×4 multiplier for each of three other lanes.

2. A digital signal processor (DSP), comprising:
   a fracturable multiplier;
   a fracturable adder;
   a fracturable variable shifter; and
   at least one sign-extension block that is configured to provide sign extension across modes of the DSP comprising normal mode, dual-fracturing mode and quad-fracturing mode, wherein:
   the fracturable adder, in the normal mode, comprises an adder having 48 bit inputs and 48 bit output;
   the fracturable adder, in the dual-fracturing mode, comprises two adders each having 24 bit inputs and 24 bit output; or
   the fracturable adder, in the quad-fracturing mode, comprises four adders each having 12 bit inputs and 12 bit output.

3. A digital signal processor (DSP), comprising:
   a fracturable multiplier;
   a fracturable adder;
   a fracturable variable shifter; and
   at least one sign-extension block that is configured to provide sign extension across modes of the DSP comprising normal mode, dual-fracturing mode and quad-fracturing mode, wherein:
   the fracturable variable shifter, in the normal mode, comprises a shifter having 48 bit input and output and a 4 bit shift argument;
   the fracturable variable shifter, in the dual-fracturing mode, comprises two shifters each having 24 bit input and output and respective 4 bit shift argument; and
   the fracturable variable shifter, in the quad-fracturing mode, comprises four shifters each having 12 bit input and output and respective 4 bit shift argument.

4. The DSP of claim 1, wherein each of the at least one sign-extension block is to perform sign-extension and zero padding depending on at least one of the modes of the DSP.

5. A digital signal processor (DSP), comprising:
   a fracturable multiplier;
   a fracturable adder;
   a fracturable variable shifter; and
   at least one sign-extension block that is configured to provide sign extension across modes of the DSP comprising normal mode, dual-fracturing mode and quad-fracturing mode, wherein:
   the fracturable multiplier supports dual fracturing by providing two multipliers in the dual-fracturing mode, and quad fracturing by providing four multipliers in the quad-fracturing mode, with carry-gating in a Wallace tree multiplier.

6. A digital signal processor (DSP), comprising:
   a fracturable multiplier;
   a fracturable adder;
   a fracturable variable shifter; and at least one sign-extension block that is configured to provide sign extension across modes of the DSP comprising normal mode, dual-fracturing mode and quad-fracturing mode, wherein:

the fracturable adder supports dual-fracturing, providing two adders in the dual-fracturing mode, and quad fracturing, providing four adders in the quad-fracturing mode, with carry-gating in a Sklansky carry-look ahead adder according to the modes of the DSP.

7. A digital signal processor (DSP), comprising:
a fracturable multiplier;
a fracturable adder;
a fracturable variable shifter; and
at least one sign-extension block that is configured to provide sign extension across modes of the DSP comprising normal mode, dual-fracturing mode and quad-fracturing mode, wherein:
the fracturable variable shifter comprises four shifters each having 27 bit input, 12 bit output, and 4 bit shift argument.

8. In a field programmable gate array (FPGA), a digital signal processing (DSP) block comprising:
a fracturable multiplier providing a single multiplier in a normal mode, two multipliers in a dual-fracturing mode, and four multipliers in a quad-fracturing mode;
a fracturable adder providing a single adder in the normal mode, two adders in the dual-fracturing mode, and four adders in the quad-fracturing mode;
a first sign-extension block that is configured to couple the fracturable multiplier to the fracturable adder;
a second sign-extension block that is configured to couple an input to the fracturable adder; and
a fracturable variable shifter coupled to the fracturable adder and providing a single shifter in the normal mode, two shifters in the dual-fracturing mode, and four shifters in the quad-fracturing mode, each such shifter to shift a result from the fracturable adder according to a shift argument.

9. The DSP block of claim 8, wherein:
the fracturable multiplier comprises a 19×18 multiplier in the normal mode, comprises an 11×10 multiplier for a most significant bit (MSB) lane in the dual-fracturing mode and an 8×8 multiplier for a least significant bit (LSB) lane in the dual-fracturing mode, and comprises a 7×6 multiplier for the MSB lane and a 4×4 multiplier for each of three other lanes in the quad-fracturing mode.

10. The DSP block of claim 8, wherein:
the fracturable adder comprises an adder having 48 bit inputs and 48 bit output in the normal mode, comprises two adders each having 24 bit inputs and 24 bit output in the dual-fracturing mode, and comprises four adders each having 12 bit inputs and 12 bit output in the quad-fracturing mode.

11. The DSP block of claim 8, wherein:
the fracturable variable shifter comprises a shifter having 48 bit input and output and a 4 bit shift argument in the normal mode, comprises two shifters each having 24 bit input and output and respective 4 bit shift argument in the dual-fracturing mode, and comprises four shifters each having 12 bit input and output and respective 4 bit shift argument in the quad-fracturing mode.

12. The DSP block of claim 8, wherein:
the fracturable multiplier comprises a single multiplier in the normal mode, two multipliers in the dual-fracturing mode and four multipliers in the quad-fracturing mode, with carry-gating in a Wallace tree multiplier according to the normal, dual fracturing and quad fracturing modes of the DSP block.

13. The DSP block of claim 8, wherein:
the fracturable adder comprises a single adder in the normal mode, two adders in the dual-fracturing mode, and four adders in the quad-fracturing mode, with carry-gating in a Sklansky carry-look ahead adder according to the normal, dual fracturing and quad fracturing modes of the DSP block.

14. The DSP block of claim 8, wherein:
the fracturable variable shifter comprises four shifters each having 27 bit input, 12 bit output, and 4 bit shift argument, to perform as a 1×48 bit input shifter in the normal mode, 2×24 bit input shifters in the dual-fracturing mode, and 4×24 bit input shifters in the quad-fracturing mode.

15. A method performed by a DSP block, the method comprising:
coupling a fracturable multiplier, a fracturable adder, and a fracturable variable shifter of the DSP block to perform digital signal processing; and
providing support for a plurality of modes of the DSP block, comprising normal mode, dual-fracturing mode and quad-fracturing mode, through at least one sign-extension block of the DSP block, wherein the providing the support through the at least one sign-extension block comprises:
coupling the at least one sign-extension block between output of the fracturable multiplier and input of the fracturable adder, with the fracturable multiplier providing a single multiplier in the normal mode, two multipliers in the dual-fracturing mode, and four multipliers in the quad-fracturing mode, and with the fracturable adder providing a single adder in the normal mode, two adders in the dual-fracturing mode, and four adders in the quad-fracturing mode.

16. A method performed by a DSP block, the method comprising:
coupling a fracturable multiplier, a fracturable adder, and a fracturable variable shifter of the DSP block to perform digital signal processing; and
providing support for a plurality of modes of the DSP block, comprising normal mode, dual-fracturing mode and quad-fracturing mode, through at least one sign-extension block of the DSP block, wherein the supporting through the at least one sign-extension block comprises the at least one sign-extension block performing sign-extension, zero padding on most significant bit (MSB) lane, and zero padding on least significant bit (LSB) lane, depending on a runtime configuration.

17. A method performed by a DSP block, the method comprising:
coupling a fracturable multiplier, a fracturable adder, and a fracturable variable shifter of the DSP block to perform digital signal processing; and
providing support for a plurality of modes of the DSP block, comprising normal mode, dual-fracturing mode and quad-fracturing mode, through at least one sign-extension block of the DSP block, wherein the providing the support for the plurality of modes further comprises the fracturable multiplier having carry-gating in a Wallace tree multiplier.

18. A method performed by a DSP block, the method comprising:

coupling a fracturable multiplier, a fracturable adder, and a fracturable variable shifter of the DSP block to perform digital signal processing; and providing support for a plurality of modes of the DSP block, comprising normal mode, dual-fracturing mode and quad-fracturing mode, through at least one sign-extension block of the DSP block, wherein the providing the support for the plurality of modes further comprises the fracturable adder having carry-gating in a Sklansky carry-look ahead adder.

* * * * *